(12) United States Patent
Ribalta et al.

(10) Patent No.: US 8,562,771 B2
(45) Date of Patent: Oct. 22, 2013

(54) JOINTS HAVING IMPROVED SEALABILITY, LUBRICATION AND CORROSION RESISTANCE

(75) Inventors: Jesus Casar Ribalta, Buenos Aires (AR); Diego Nicolás Dell'erba, Buenos Aires (AR); Gabriel Eduardo Carcagno, Buenos Aires (AR)

(73) Assignee: Tenaris Connections Limited, Kingstown (VC)

( * ) Notice: Subject to any disclaimer, the term of this patent is extended or adjusted under 35 U.S.C. 154(b) by 103 days.

(21) Appl. No.: 13/187,346

(22) Filed: Jul. 20, 2011

(65) Prior Publication Data

US 2012/0018081 A1 Jan. 26, 2012

Related U.S. Application Data

(60) Provisional application No. 61/365,952, filed on Jul. 20, 2010, provisional application No. 61/367,822, filed on Jul. 26, 2010, provisional application No. 61/368,400, filed on Jul. 28, 2010, provisional application No. 61/394,311, filed on Oct. 18, 2010.

(51) Int. Cl.
*F16L 58/10* (2006.01)
*F16L 15/00* (2006.01)
*B32B 1/08* (2006.01)

(52) U.S. Cl.
USPC ............. 156/158; 29/458; 427/410; 285/94; 285/333; 285/355

(58) Field of Classification Search
USPC ............. 156/158; 285/94, 333, 355; 29/458; 427/409, 410
See application file for complete search history.

(56) References Cited

U.S. PATENT DOCUMENTS

| 4,962,579 A | 10/1990 | Moyer et al. |
| 6,027,145 A * | 2/2000 | Tsuru et al. ............. 285/94 |

(Continued)

FOREIGN PATENT DOCUMENTS

| WO | WO 2006/104251 | 10/2006 |
| WO | WO 2007/063079 A1 | 6/2007 |
| WO | WO 2009/072486 | 6/2009 |

OTHER PUBLICATIONS

American Standard API 5B Supplemental Req. (API TR 5TRSR22), "Technical Report in SR22 Supplementary Requirements for Enhanced Leak Resistance LTC, First Edition," Ameriacan Petroleum Institute, Jun. 1, 2002.
PCT International Preliminary Report on Patentability and Written Opinion re PCT Application No. PCT/IB2011/002471, dated May 30, 2013.

(Continued)

*Primary Examiner* — Michael Tolin
(74) *Attorney, Agent, or Firm* — Knobbe Martens Olson & Bear LLP (57) ABSTRACT

Embodiments of the present disclosure provide systems and methods for assembly of tubular joints which overcome the drawbacks and limitations of conventional joints. In certain embodiments, the tubular joints may comprise threaded joints used in oil exploration. Joints may be assembled using a combination of a) position control, b) specific production tolerances for thread parameters, and c) coatings applied on threaded areas of the joint. In further embodiments, the tubular joints may have no torque shoulder and/or metal to metal seals. In additional embodiments, the joints may be further assembled and disassembled several times without application of dope or grease and exhibit enhanced sealability. Beneficially, embodiments of the present disclosure may provide high tolerance, precisely assembled joints that provide improved performance (e.g., mechanical performance, sealability, corrosion resistance, lubrication) and reliability over non-premium connections without the expense associated with premium connections.

38 Claims, 4 Drawing Sheets

(56) References Cited

U.S. PATENT DOCUMENTS

| | | | |
|---|---|---|---|
| 6,679,526 B2 | 1/2004 | Yamamoto et al. | |
| 6,921,110 B2 | 7/2005 | Morotti et al. | |
| 6,933,264 B2* | 8/2005 | Petelot | 508/318 |
| 6,971,681 B2 | 12/2005 | Dell'Erba et al. | |
| 2006/0228505 A1* | 10/2006 | Goto et al. | 428/36.9 |
| 2008/0277925 A1* | 11/2008 | Goto et al. | 285/94 |

OTHER PUBLICATIONS

PCT International Search Report and Written Opinion re PCT Application No. PCT/IB2011/002471, dated Apr. 25, 2013.

API Specification 5B and Specification for Threading, Gauging and Thread Inspection of Casing, Tubing, and Line Pipe Threads, pp. 88 and 89, in 2 pages. (Discussing Thread Taper).

* cited by examiner

JOINTS HAVING IMPROVED SEALABILITY, LUBRICATION AND CORROSION RESISTANCE

CROSS-REFERENCE TO RELATED APPLICATIONS

This application claims the benefit of priority of U.S. Provisional Patent Application No. 61/365,952, entitled "THREADED JOINT WITH SURFACE TREATMENT", filed on Jul. 20, 2010, U.S. Provisional Patent Application No. 61/367,822, entitled "COATINGS FOR THREADED CONNECTIONS", filed on Jul. 26, 2010, U.S. Provisional Patent Application No. 61/368,400, entitled "SURFACE TREATMENTS FOR THREADED CONNECTIONS", filed on Jul. 28, 2010, and U.S. Provisional Patent Application No, 61/394,311 filed on Oct. 18, 2010, entitled "TORQUE POSITION MAKEUP OF TUBULAR JOINTS WITH SURFACE TREATMENT". This application is also related to International Patent Application No. PCT/IB2011/002471, entitled "JOINTS HAVING IMPROVED SEALABILITY, LUBRICATION, AND CORROSION RESISTANCE", filed in the PCT on Jul. 20, 2011. The entirety of each of these applications is hereby incorporated by reference and should be considered a part of this specification.

BACKGROUND

1. Field

Embodiments of the present disclosure relate to assembly of threaded joints and joints so assembled. In certain embodiments, the present disclosure pertains to a combination of thread tolerances, position control, and coatings for use in assembly of threaded connections used to join pipes in oil and gas applications.

2. Description of the Related Art

In oilfields, it is common practice to use metallic pipes to extract oil or gas from underground reservoirs or pools. Extraction may include boring a well into the earth and internal casement of the well. Casement provides the well with structural stability, inhibiting collapse of the well, and may be performed using a string of relatively large diameter metallic tubes, referred to as the casing. After the well has been bored to the desired depth and the casement has been put in place, a string of metallic pipes of smaller diameter may also be placed in the well. These smaller pipes, referred to as the tubing, may pump the gaseous or liquid hydrocarbons to the surface. The smaller pipes that form the tubing are joined in a string so to extend over a length sufficient to reach the depth of extraction. Both the casing string and tubing strings may be formed of pipe segments joined together using threaded connectors.

During assembly of either the casing pipes or the tubing pipes, threads and other surfaces of the pipes that are in sliding contact may experience galling. Galling refers surface damage (e.g., adhesive wear) arising from contact between sliding solids and is distinguished by localized roughening and creation of protrusions above the original surface. For example, asperities present on the respective sliding surfaces may experience high pressures, raising the temperature and adhesion within the contact zone of the asperities. With continued contact, material transfer between the surfaces may occur and the transferred material may grow into protrusions. If a protrusion of transferred material grows to a large enough height (e.g., several microns), the protrusion may cause damage to the opposing surface. Furthermore, the surfaces may experience increased adhesion and the friction needed for further advancement.

Figure 1:
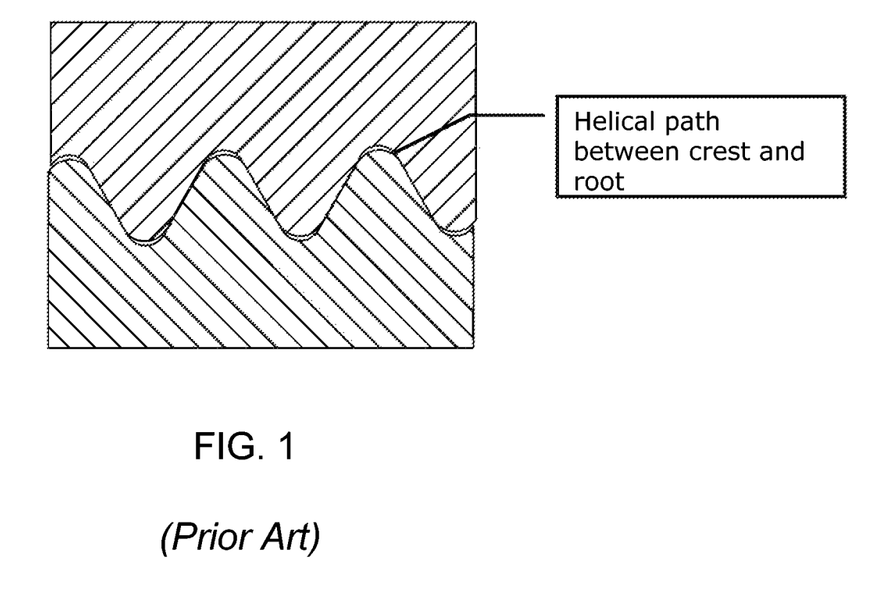
FIG. 1 is a schematic illustration of a prior art connection which employs grease.

It is common practice to use dope or grease on the surface of the threads of male and female elements of the threaded connection during assembly of the pipes in order to inhibit galling. The grease or dope also plays a significant role in sealability by filling the space between crests and roots of the respective pipe threads when the connection is assembled, blocking paths for possible leaks (see, e.g., FIG. 1). The dope may include small particles of heavy metals, such as Pb or Cu.

The use of dope presents significant drawbacks, however. Notably, high concentrations of heavy metals can result in heavy metal accumulation in the bodies of humans and animals, causing serious illness. Furthermore, the heavy metals present in dope may contaminate soil, groundwater, and ocean water, presenting an environmental hazard. Furthermore, in light of these hazards, strict regulations prohibiting discharge of heavy metals may necessitate precautions when utilizing dope, increasing the cost to employ dope.

In addition to the aforementioned issues, the use of dope may further necessitate operations such as cleaning and doping of the threaded connections in the field during use. These operations are expensive and time consuming, as they are labor intensive. Additionally, these operations may expose personnel to safety risks, as they require exposure to moving pipes and often take place under adverse conditions.

Other issues encountered when employing dope may include either "underdoping" or "overdoping." In underdoping, insufficient dope is provided to the threaded connection and/or the dope fails to distribute over the surface of the threaded connection. As a result, the likelihood of galling is increased within underdoped regions.

While application of excess dope may address the issue of underdoping, this approach risks overdoping, the condition of placing too much dope on the threads of the connectors. Overdoping may create conditions such that, during assembly of the connector, excess dope is unable to be evacuated through the end of the threaded portions of the pipe segments. The trapped dope can develop high pressure within the threaded connection and lead to plastic deformation of the pipe segments in the threaded portion. In extreme cases, this plastic deformation may cause collapse of the male member of the joint, rendering the connector ineffective, and requiring replacement of the pipe segments and/or the sleeve.

Furthermore, while dopes have been developed which substitute fillers for heavy metals, these dopes are also problematic. In one example, there are presently no standards for these fillers. As such, high friction variability and tribological behavior may be observed between different proprietary manufacturer formulations. This variability is undesirable as it may lead to uncertainty in joint performance between each brand of dope.

SUMMARY

In an embodiment, a method of assembling a joint is provided. The method comprises assembling a pin member and a box member of a threaded connection. The pin and box members may each possess threads having parameters within selected tolerances. The thread parameters may include thread pitch, thread taper, and thread ovality. The pin and box members may be further configured with respective coating systems, different from one another, on at least a portion of the threads of each member. A first coating system present on a surface of the threads of the pin member may provide corrosion resistance, while a second coating system on a surface of the threads of the box member may provide lubrication and, optionally, corrosion resistance. The pin and box members so configured may be assembled by a position control technique in which the box member is positioned at a selected position with respect to the pin member. The joint so assembled may achieve substantially no leakage of fluids contained within the joint. The joint so assembled may also achieve substantially no galling during assembly. The joint so assembled may also achieve substantially no corrosion when exposed to a corrosive environment for a selected time.

In an embodiment, a method of assembling a joint is provided. The method comprises selecting tolerances for a first pipe comprising a male threaded coupling and a second pipe comprising a female threaded coupling configured to receive the male threaded coupling of the first pipe. The method further comprises depositing a first coating on at least a portion of the threads of the first pipe having the selected tolerances. The first coating may comprise a first layer selected from manganese phosphate and zinc phosphate. A thickness of the first layer may be selected between about 4 µm to about 10 µm. The first coating may further comprise a second layer positioned over at least a portion of the first layer, where the second layer may comprise an epoxy and possess anti-corrosion properties. A thickness of the second layer may be selected between about 25 µm to about 50 µm. The first coating may additionally comprise a third layer positioned over at least a portion of the second layer, where the third layer comprises a wax. A thickness of the third layer may be selected between about 12 µm to about 15 µm. The method may additionally comprise depositing a second coating on the second pipe having the selected tolerances. The second coating may comprise a first layer selected from manganese phosphate and zinc phosphate. A thickness of the first layer may be selected between about 4 µm to about 10 µm. The second coating may comprise a second layer positioned over at least a portion of the first layer, where the second layer may comprise an epoxy and possess lubricating properties. A thickness of the second layer may be selected between about 25 µm to about 50 µm. The second coating may further comprise a third layer positioned over at least a portion of the second layer, where the third layer comprises a wax. A thickness of the third layer may be selected between about 12 µm to about 15 µm. The method may also comprise positioning the threads of the second pipe at a selected position with respect to the first pipe within the joint. Thread parameters of the first and second pipe may be within selected parameter ranges. Additionally, the assembled joint may exhibit substantially no leakage when tested according to API 5C1 under internal pressure less than or equal to 7800 psi and time durations less than or equal to 60 minutes.

In a further embodiment, a method of assembling a joint may be provided. The method may comprise depositing a first coating on a first pipe comprising a male threaded coupling at an end of the first pipe. The first coating may comprise a first adhesion promotion layer positioned on at least a portion of the threads of the first pipe, a second semi-elastic layer positioned over at least a portion of the first layer, where the second layer possesses anti-corrosion properties, and a third hydrophilic, deformable layer positioned over at least a portion of the second layer. The method may also comprise depositing a second coating on a second pipe comprising a female threaded coupling at an end of the second pipe, the female threaded coupling configured to receive the male threaded coupling of the first pipe. The second coating may comprise a first adhesion promotion layer positioned over at least a portion of the threads of the second pipe, a second semi-elastic layer positioned over at least a portion of the first layer, where the second layer possesses lubricating properties, and a third hydrophilic, deformable layer positioned over at least a portion of the second layer. The method may also comprise positioning the threads of the second pipe at a selected position with respect to the first pipe within the joint. Thread parameters of the first and second pipe may be within selected parameter ranges.

In an additional embodiment, a joint may be provided. The joint may comprise a first pipe comprising a male threaded coupling at an end of the first pipe. The joint may also comprise a second pipe comprising a female threaded coupling at an end of the second pipe, the female threaded coupling configured to receive the male threaded coupling of the first pipe. The joint may additionally comprise a first coating on the first pipe. The first coating may comprise a first layer positioned over at least a portion of the threads of the first pipe, where the first layer comprises a phosphate, a second layer positioned over at least a portion of the first layer, where the second layer comprises an epoxy and one or more corrosion inhibiting additives, and a third layer positioned over at least a portion of the second layer, where the third layer comprises a wax. The joint may also comprise a second coating on the second pipe. The second coating may comprise a first layer positioned over at least a portion of the threads of the second pipe, where the first layer comprises a phosphate, a second layer positioned over at least a portion of the first layer, where the second layer comprises an epoxy and one or more lubricating additives, and a third layer positioned over at least a portion of the second layer, where the third layer comprises a wax. Neither of the first and second pipe may comprise a torque shoulder. Additionally, thread parameters of the first and second pipe may be within selected parameter ranges. Furthermore, the second pipe may be positioned at a selected position with respect to the first pipe within the joint.

BRIEF DESCRIPTION OF THE DRAWINGS

FIGS. 2A and 2B show schematic illustrations of a pin and box during assembly using position control; FIG. 2A, prior to final position; FIG. 2B, after final position is achieved;

DETAILED DESCRIPTION

The term "pipe" as used herein is a broad term and includes its ordinary dictionary meaning and also refers to a generally hollow, elongate member which may be straight or have bends or curves and be formed to a predetermined shape. The pipe may be tubular, having a substantially circular outer surface and inner surface, although other shapes and cross-sections are contemplated as well. As used herein, the term "tubular" refers to any elongate, hollow shape, which need not be circular or cylindrical.

The terms "approximately," "about," and "substantially" as used herein represent an amount close to the stated amount that still performs a desired function or achieves a desired result. For example, the terms "approximately," "about," and "substantially" may refer to an amount that is within less than 10% of, within less than 5% of, within less than 1% of, within less than 0.1% of, and within less than 0.01% of the stated amount.

Typically, connections possessing a torque shoulder (e.g., "premium connections") are more sophisticated in design/manufacture and have higher tolerances in terms of sealability to gas fluids and more precise assembling conditions. The metal-to-metal seals in this type of connection are, therefore, significantly more expensive than their counterparts which lack metal-to-metal seals and torque shoulder (e.g., "non-premium connections"). As such, premium connections are typically employed only in high value operations, where the added cost of the connections is justified by the output of the field.

In contrast, non-premium connections are relatively imprecise in their assembly owing to lack of a torque shoulder and metal-to-metal connection. As a result, the sealing and mechanical properties exhibited by non-premium connections are highly variable, depending upon their assembly condition and manufacturing tolerances.

Embodiments of the present disclosure provide systems and methods for assembly of tubular joints which overcome the drawbacks and limitations of conventional joints. In certain embodiments, the tubular joints may comprise threaded joints used in oil exploration. Joints may be assembled using a combination of a) position control, b) specific production tolerances for parameters of the threads, and c) coatings applied on threaded areas of the joint. In further embodiments, the tubular joints may have no torque shoulder and/or metal to metal seals. In additional embodiments, the joints may be further assembled and disassembled several times without application of dope or grease and exhibit enhanced sealability. Beneficially, embodiments of the present disclosure may provide high tolerance, precisely assembled joints that provide improved performance (e.g., mechanical performance, sealability, corrosion resistance, lubrication) and/or reliability over non-premium connections without the expense associated with premium connections.

Position control of a connection may be achieved by controlling the position of the pin end with respect to the box end within the threaded connection. For example, reference marks may be placed on the end of a pipe (e.g., where the male thread is placed). These marks are employed to position the coupling end (e.g., where female threads are located) in relative position within a certain tolerance. In this manner, bearing stresses, the stresses resulting from the contact of the two ends of the joint, may be developed in sufficient magnitude for a desired sealability response.

Torque of the joint may be further verified over a selected minimum level. However, it may not be a requirement that the torque of the assembled joint is greater than or equal to the minimum level. Rather, positioning the joint ends at a selected position, within defined tolerances, may ensure that the joint may provide the desired sealability response.

In an embodiment, production tolerances may be based upon direct thread parameter control instead of control based upon common standoff gages. Conventional standoff gauges integrate the state of several thread parameters (e.g., thread pitch diameter, thread ovality, and thread taper) into one parameter. Thus, thread control based upon standoff gauges is a broad control. In contrast, thread parameters may be each independently controlled in embodiments of the disclosed joints.

In one embodiment, production tolerances may independently control thread pitch diameter. Pitch diameter is a measure of the distance that lies between the major diameter of a thread, the diameter of the thread at its largest point, and the minor diameter of the thread, the diameter of the thread at its smallest point. Pitch diameter tolerances may be limited in a manner that is compatible with threading machine capability and desired productivity.

In another embodiment, production tolerances may independently control the maximum thread ovality. Thread ovality is the degree of deviation from perfect circularity of the thread.

In further embodiments, production tolerances may independently the thread taper. A tapered thread is one in which the threads comprise ridges wrapped around a conical structure.

It may be understood that any one of pitch diameter control, thread ovality control, and taper control may be employed singly or in any combination in embodiments of the present disclosure.

In further embodiments, coating systems may be applied to the threaded areas of the joint. In an embodiment, a first coating system may be provided that is configured for deposition upon at least a portion of a first threaded connection surface (e.g., a pin) and a second coating system may be provided that is configured for deposition upon at least a portion of a second threaded connection surface (e.g., a box).

In an embodiment, the first and second coating systems may each comprise a first layer of either manganese phosphate or zinc phosphate upon the pin or box, a second, layer comprising a curable material (e.g., epoxy), and a third layer comprising a wax. The second epoxy layers may be applied over the first phosphate layers and cured. The layers of microcrystalline wax may be applied over the epoxy layers and dried. The curing and the drying processes may be performed with infrared (IR) lamps, as needed.

The first phosphate layers may promote adhesion of the second epoxy layers to the pin or box surface. The phosphate layers should not be employed alone (e.g., absent the epoxy and wax layers) as the phosphates possess low corrosion resistance and substantially no lubricating effect, resulting in corrosion and galling.

The composition of the epoxy layers may be independently varied between the coating systems applied to the pin and the box. Between the two connection members, the pin is at higher risk of corrosion while the box is less subject to corrosion. Therefore, an epoxy having corrosion resistance may be applied to the pin. An epoxy having lubricating properties (and some anti-corrosion properties) may be applied to the box. The epoxy exhibiting lubrication properties may possess a lower hardness than the epoxy exhibiting corrosion resistance so as to promote lubrication by transfer of the lubricating epoxy from one layer to the other one.

The epoxies should not be applied directly to the pin or box surface, as insufficient adhesion is present between the bare steel and the epoxy, resulting in spallation of the coating systems 104, 114 when subject to high contact pressures during assembly of the joint and loss of desired anti-corrosion and lubrication properties.

The third wax layers may act to fill voids of thread flanks of the join in order to block leak pathways. The wax may comprise a microcrystalline wax which possesses a greater purity than non-microcrystalline waxes. Higher purity of the wax may provide more homogeneous composition and less variability in performance. In further embodiments, the wax may be oxidized in order to facilitate emulsification in water for deposition upon the epoxy layers. This presents a more environmentally desirable delivery mechanism and is further easier than use of corrosive, inflammable solvents.

Thus, the combination of the first phosphate layers, the second epoxy layers, and the third wax layers is found to provide the desired balance of coating adhesion, corrosion resistance, and lubrication.

The performance of this type of tapered threaded joints, referred to as API connections, is dependant on the make up assembly condition of the joint. A reason for this dependence is that the connection's sealability is provided by increasing contact stresses. Increased contact stresses are provided by increased engagement of the threads through rotational torque. In connections employing dope or grease, the assembly conditions typically include friction factors related primarily to the type and amount of dope or grease present in the connection. In embodiments of the present disclosure, however, an API type connection possessing enhanced sealability response may be provided due to the use of joint assembly by position methods, employing specific production tolerances, and coatings applied on threaded areas of the joint.

In further advantage, embodiments of the present disclosure also solve environmental problems related to the use of dope or grease in oilfield operations. Dopes and greases, typically contain heavy metal particles such as Pb, Cu, or Zn which are environmentally hazardous. By forgoing the use of dopes and grease, the environmental problems associated with dopes and greases are moot. Furthermore, as embodiments of the coatings described herein are applied on threads in lieu of dopes and greases, the time and labor needed to clean and dope connections at oilfield locations is substantially reduced or eliminated.

In additional advantage, rejects at make up operation may also be reduced by embodiments of the present disclosure.

Embodiments of the coating systems disclosed herein are suitable for applications such as threaded steel pipe connections, where extremely high loads and high local temperatures, caused by friction during the assembly process, are present. Additional details on threaded steel pipes can be found in U.S. Pat. No. 6,921,110, entitled "Threaded Joint for Tubes," U.S. Pat. No. 6,971,681, entitled "Threaded Pipe with Surface Treatment," and International Patent Application Number WO/2007/063079, entitled "Threaded Connections With High and Low Friction Coatings," the entirety of each of which is hereby incorporated by reference and should be considered a part of this specification.

Beneficially, the use of two different coating systems, one for the pin and one for the box, inhibits galling, corrosion, and sealability problems observed in conventional threaded connections. Furthermore, these benefits may be provided without expensive design additions, such as torque shoulders and metal-to-metal contacts. Furthermore, for standard torques, for each diameter, different coatings do not transition through a liquid or semi-liquid intermediate state. While embodiments of the disclosed may be discussed in the context of make up of American Petroleum Institute (API) connections, it may be understood that the disclosed embodiments may be employed in conjunction with any type of joint.

Position Control

Position control may be achieved according to one of several methods in order to achieve the relative positioning of the male part (e.g., pin) with respect to the female part (e.g., coupling or box). In one embodiment, reference marks may be placed on pipe ends as described in U.S. Pat. No. 4,962,579, the entirety of which is hereby incorporated by reference. The position assembly method using reference marks for controlling the pin-box relative position is very convenient for mill and field use, as it requires no additional actions other than placing the box face within the reference marks independently of the torque applied.

In further embodiments, as an example, other torque position methods of assembly may be employed based upon the same visually referenced method. For example, U.S. Pat. No. 4,962,579 requires the fulfillment of two simultaneous requirements, that the joint torque is within a certain range and that the position of the joint ends (e.g., pin and box) is within a selected range. In contrast, embodiments of the present disclosure may employ only a position of the joint ends within a defined range and torque control may not be employed.

Figure 2A:
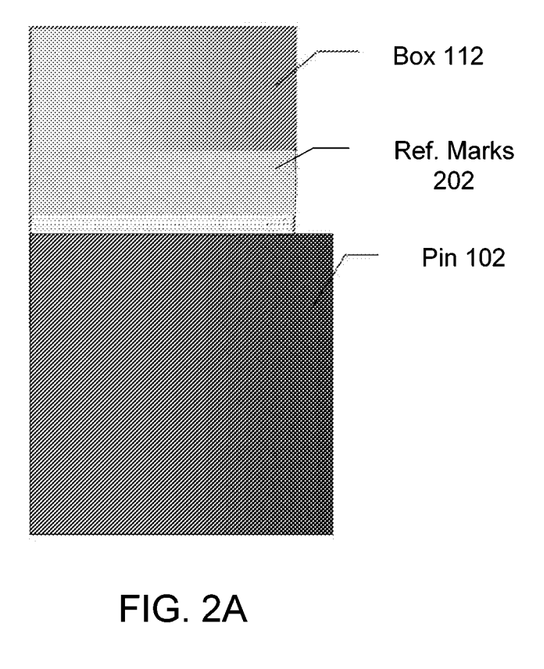
Figure 2B:
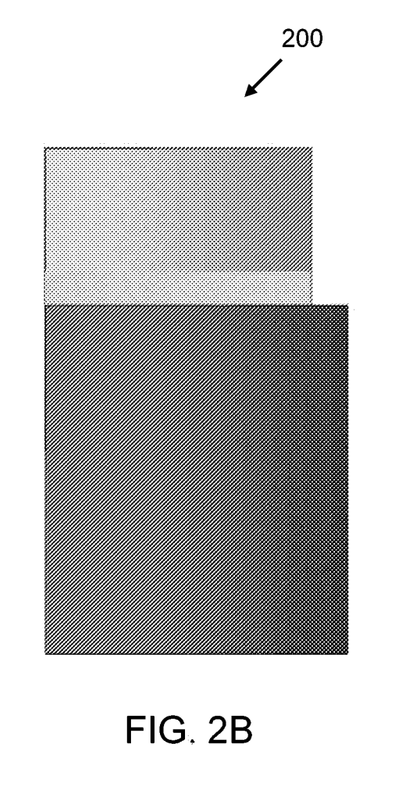

For example, as illustrated in FIG. 2A, a joint 200 is illustrated as comprising a pin 102 and a box 112. Prior to assembly of the joint 200, reference marks 202 are indicated on the pin 102 for positioning the box 112. When assembling the box 112 on the pin 102 the position of the box 112 may be controlled with respect to the reference marks 202 on the pin 102 to achieve the final position of the box 112 (FIG. 2B).

Production Tolerances

In certain embodiments, production tolerances may be reached by applying the American Standard API 5B Supplementary Requirement SR22, hereby incorporated by reference. These tolerances for pitch diameter, thread taper, and thread ovality are illustrated below in Table 1. In alternate embodiments, tighter tolerances than those specified in the American Standard API 5B Supplementary Requirement SR22 may be employed, as further illustrated below in Table 1.

TABLE 1

Selected Thread Production Tolerances

| Parameter | API 5B | Instant Application |
|---|---|---|
| Pitch diameter | +/−0.0078" | +/−0.004" |
| Thread taper | 0.060/0.0677 | 0.060/0.065 |
| Thread ovality | Not specified | 0.010" (maximum) |

Beneficially, it has been determined that the parameters listed in Table 1 provide a good balance between quality and stability of assembly conditions, performance of the joint (e.g., mechanical performance, sealability), and cost when employed in conjunction with position control assembly and thread coatings. In particular, the tolerances illustrated under "Instant Application" in Table 1 have been found to provide improved performance over those of API 5B.

Thread Coatings

In an embodiment, coatings with at least anti-corrosion and/or lubricant properties may be applied on either male, female, or both threaded surfaces. Embodiments of such coatings may include those described in U.S. Pat. Nos. 6,971,681 and 6,679,526, the entirety of each of which are hereby incorporated by reference.

Figure 3:
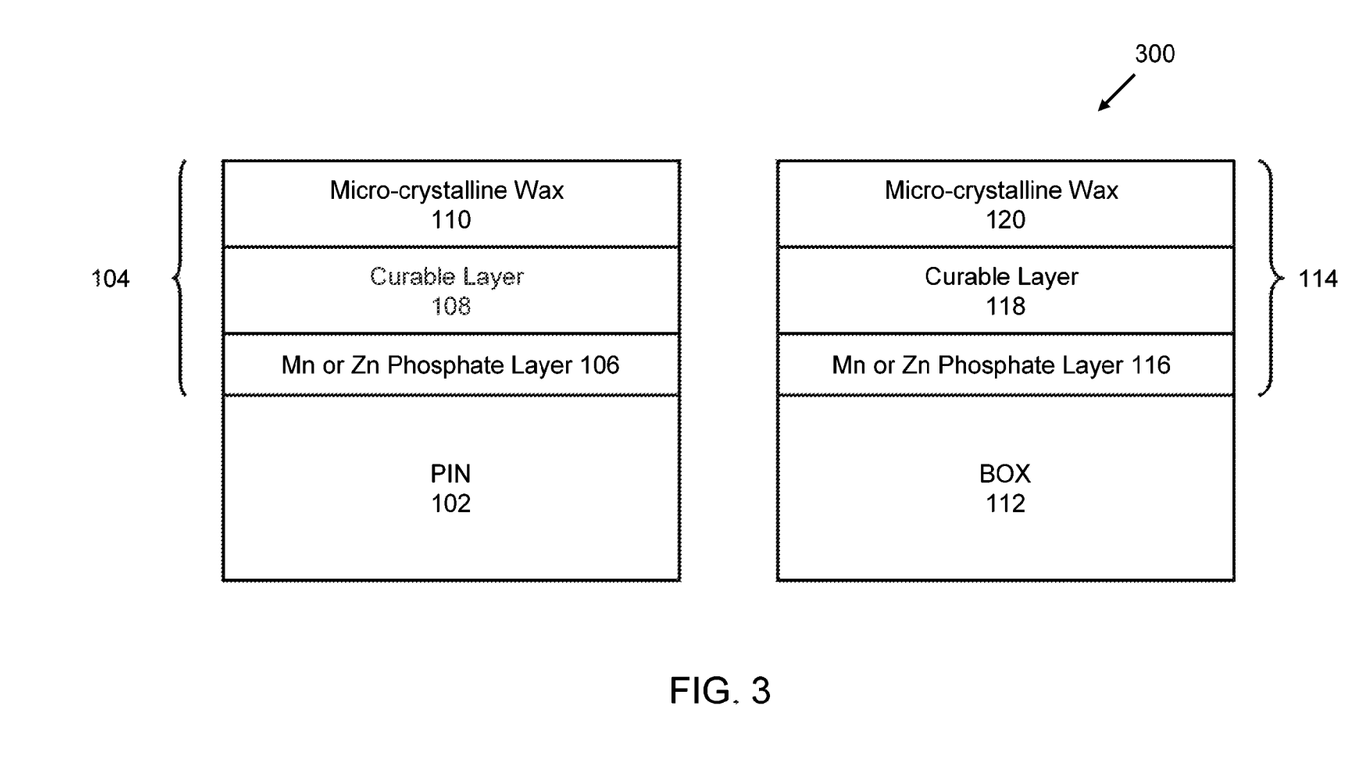
FIG. 3 is a schematic illustration of an embodiment of coating systems for a threaded connection including a pin and a box.

FIG. 3 illustrates embodiments of coatings 104 and 114 for a threaded connection 300. The threaded connection 300 may include a pin 102 and a box 112. In certain embodiments, the pin 102 and box 112 may not include a torque shoulder or metal-to-metal seal. A first coating system 104 may be deposited on the pin 102 and a second coating system 114, different than the first coating system 104, may be deposited on the box 112. With respect to the first coating system 104, a layer 106 (e.g., a first layer) of the first coating system 104 may comprise a material that adheres well to the pin 102 and further promotes adherence of a second layer 108 to the first layer 106. Another layer 108 (e.g., a second layer) of the first coating system 104 may comprise a layer which imparts improved corrosion resistance to the threaded connection 300. A third layer 110 may be further deposited on the second layer 108 to enhance sealabilty of the threaded connection 300.

In general, each off coating layers should be present within specified thicknesses, as discussed below. If the thickness of a given layer is less than that specified, contact pressures developed at the threads may be insufficient to overcome the pressure of the fluid to be sealed when the final assembly position is reached. Therefore, if the thickness of a given layer is too low, the coatings 102, 112 may not be able to fill voids of the thread flanks and inhibit fluid leakage. Furthermore, if the thickness of a given layer is greater than that specified, the torque applied to reach the specified assembly position will be increased over that applied when the thickness of the given layer is within the specified range. Furthermore, the sliding distance (related to the amount of turn to be performed) will be increased. As a result, the likelihood of galling may be increased, potentially compromising the sealing performance of the coatings 102, 112.

In one embodiment, the first layer 106 of the first coating system 104 may comprise one of manganese phosphate and zinc phosphate. The thickness of the first coating layer 106 may be selected within the range between about 4 µm to about 10 µm. In certain embodiments, zinc phosphate may be applied to the pin 102 rather than manganese phosphate, for ease of production. In further embodiments, zinc phosphate may be applied to one of the pin 102 or box 112 and manganese phosphate may be applied to the other of the pin 102 or box 112. In another embodiment, the second coating layer 108 of the first coating system 104 may comprise a semi-elastic material. In certain embodiments the semi-elastic material may comprise a two-component curable material. In additional embodiments, the curable material may comprise a two-component epoxy.

In further embodiments the second coating layer 108 may comprise anti-corrosion pigments which elevate the corrosion resistance of the second layer 108 over a comparable layer absent the anti-corrosion pigments. In certain embodiments, the thickness of the second coating layer 108, after a drying process discussed in greater detail below, may be selected within the range between about 25 microns to about 50 microns. The composition of a two-component epoxy layer for use with the second coating layer 108 may be given in Table 2 below. It may be understood, however, that compositions, including amounts, other than those of Table 2 may be employed.

TABLE 2

Composition of a Two-Component Epoxy of First Coating System

| Component | Amount (wt. %) |
| --- | --- |
| Part A | |
| Epoxy resin | 20 |
| Xylene | 2 |
| Barium Sulfate | 25 |
| Zinc Oxide | 5 |
| Bentone | 0.39 |
| Dioctyl pthalate | 0.65 |
| Abestine | 9 |
| Aerosil | 0.6 |
| Part B | |
| Polyamide | 6 |
| Xylene | 5 |
| Bitumen | 20 |
| Dioctyl pthalate | 0.26 |
| Barium Sulfate | 8 |
| Aerosil | 0.56 |
| Bentone | 0.56 |
| Catalyst | 0.5 |

In an embodiment, with respect to Part B, approximately 1 wt. % of the approximately 5 wt. % xylene may be added to reduce viscosity. The remaining approximately 4 wt. % xylene may be subsequently added to adjust the final formula.

The ratio between part A and B of the second epoxy layer 108 may be selected within the range between about +/−5% of about 1:1 by volume. The respective values of each of the components of Parts A and B may also vary within the range between about +/−5% of the values stated above.

In an embodiment, a solvent may also be added as a thinner up to about 10% by volume of the composition of Table 2. The thinner may adjust the viscosity of the composition and may further decrease the drying time for the composition. The stability of the resulting mixture may be about 8 hours. The viscosity of the mixture may also be about 35 to about 50 sec Ford Cup N° 4 at about 20° C.

The second two-component epoxy layer 108 may be applied upon the first phosphate layer 106 in a liquid state and subsequently dried and cured. Drying may be performed for about 10 minutes to about 40 minutes at a temperature within the range between about 50° C. to about 120° C. Drying may be further performed using one or more infrared (IR) lamps. In further embodiments, the IR lamps may be about 2 KW to about 3 KW each. It may be understood that other heat sources may be employed for drying, as needed.

After drying, a high proportion of solids may be obtained in the second epoxy layer 108. In an embodiment, the proportion of solids may be more than about 75% in weight. For example, the proportion of solids obtained after drying may be approximately 75-80% in weight.

In certain embodiments, the thickness of the second epoxy layer 108 after drying may be between about 25 microns to about 50 microns. If the thickness of the second epoxy layer 108 is less than this range, corrosion may take place and rust may be formed on the connection. This rust may increase torque and the likelihood of galling. If the thickness of the second epoxy layer is greater than this range, the likelihood of galling is significantly increased.

In another embodiment, the third coating layer 110 of the first coating system 104 may comprise a thermoplastic material. In certain embodiments, the thermoplastic material may comprise a wax. In other embodiments, the wax may have a melting temperature within the range between about 65° C. to about 70° C. In additional embodiments, the wax may comprise a microcrystalline wax. In further embodiments, the microcrystalline wax may be oxidized. For example, in one embodiment, the microcrystalline wax may be carboxylated in order to create polar ends, allowing for water solubility.

The microcrystalline wax may be formed as a water emulsion. The water emulsion may comprise the wax, about 1% to about 8% of a coalescent compound (e.g., 2-dietilaminoetanol), and substantially water as the balance of the composition. The viscosity of the emulsion so prepared may be, in one embodiment, about 24±3 sec Cup Ford N° 4 at about 25° C.

The emulsion may be applied upon the second epoxy layer 108 and dried to form the third wax layer 110. Drying may be performed for about 4 to about 10 minutes at a temperature within the range between about 60° C. to about 85° C. using infrared (IR) lamps. In certain embodiments, at least two IR lamps may be employed. In further embodiments, the IR lamps may be about 2 KW to about 3 KW each. It may be understood that other heat sources may be employed for drying, as needed. The thickness of the wax layer may be selected within the range between about 12 microns to about 15 microns.

The drying operation may substantially remove most of the solvents (e.g., water) from the wax emulsion. After drying, a high proportion of solids may be present in the third wax layer, more than about 22% by weight. This solid yield is desirable for promoting high performance of the wax in relation with other materials. That is to say, the wax layer 110 provides sealing (by filling in gaps that would otherwise allow leaking), inhibits corrosion (by exhibiting hydrophobic behavior), and melts in the desired temperature range.

In certain embodiments, the thickness of this layer after drying may be between about 20 microns to about 40 microns.

The resulting wax layer is found to exhibit very good hydrophobic properties and good corrosion resistance. For example, the wax layer 110 has been found to survive corrosion testing over approximately 200 hours by saline fog. Furthermore, this wax layer is substantially elastic and exhibits appropriate behavior for anti-galling and sealability properties. In addition, as the wax layer 110 is clear, the detection of defects on the threaded connection surface may be facilitated. Furthermore, the wax layer is not environmentally harmful, as the most abundant solvent in the emulsion from which the wax is formed is water.

With respect to the second coating system 114, a first layer 116 of the second coating system 114 may comprise a material that adheres well to the box 112 and further promotes adherence of a second layer 118 to the first layer 116. The second layer 118 of the second coating system 114 may comprise a second layer 118 which imparts improved lubrication and, optionally corrosion resistance, to the threaded connection 300. A third layer 120 may be further present to enhance sealabilty of the threaded connection 300. The first and third layers 116, 120 of the second coating 114 may be provided as discussed above with respect to the first and third layers 106, 110 of the first coating 104.

With respect to the second coating system 114 on the box 102, a second layer 118 of the second coating 114 may comprise a thermoset compound. In certain embodiments, the thermoset compound may comprise either a one-component curable material or a two-component curable material. In further embodiments, the layer 120 may comprise an epoxy including pigments and solid lubricants. The layer 120 may be positioned over the phosphate layer 116.

Embodiments of solid lubricants may include, but are not limited to, molybdenum disulfide, tungsten disulfide, boron nitride, graphite, and polytetrafluoroethylene (PFTE.

Embodiments of pigments may include, but are not limited to, green pigments. In certain embodiments, hardeners including polyamine may be employed. For example, in one embodiment, the composition of the one-component epoxy layer 118 may comprise an epoxy resin, polytetrafluoroethylene (PTFE), $TiO_2$ and a green pigment, along with a polyamine hardener.

The second epoxy layer 118 may be dried at a temperature within the temperature range of about 60° C. to about 140° C. for a time within the range between about 20 min to about 50 min. The thickness of the epoxy layer 118 may vary within the range between about 20 to about 60 microns after drying, for example, about 20 to about 40 microns. In another example, the thickness of the epoxy coating layer may vary within the range between about 30 to about 60 microns after drying. The solid content of the epoxy layer 118 may vary within the range between about 25% to about 40% in weight after drying.

In order to provide sealability, the coatings 104, 114 should provide adequate resilience and flexibility for squeezing in high contact pressure areas (e.g., thread flanks) while effectively blocking the path between crests and roots. The coating layers 104, 114 should also be able to endure several assembling and disassembling operations performed to run the string on the oilfield. A coating that is too stiff to endure the assembling and disassembling operations may increase the leak path. Coating layers that are too soft may be removed during the assembling and disassembling operations and performance will be diminished.

In one embodiment, a method to control the resilience and flexibility of a coating is through the Pigment Volume Concentration (PVC). The pigment volume concentration determines the amount of a particular pigment that can be added to the polymer of the coating. Sufficient polymer, or binder, maybe provided to substantially wet or surround at least a portion of the pigment particles. In certain embodiments, enough of the polymer may be provided to substantially completely fill the voids between the pigment particles.

PVC may be calculated using the following formula:

$$\% PVC = 100 * V_{pigment} / (V_{pigment} + V_{non\text{-}volatile\ binder})$$

where $V_{pigment}$ is the pigment volume and $V_{non\text{-}volatile\ binder}$ is the non-volatile binder volume, each given in volume percent. In certain embodiments, the PVC of any layer containing pigments may be formulated accordingly in order to have a coating with the adequate resilience and flexibility. In an embodiment, a PVC within the range of about 5% to about 50% may be employed. In further embodiments, a PVC within the range of about 15% to about 45% may be employed.

Table 3 presents experimental data illustrating the assembly and sealability performance of the joints prepared according to embodiments of the coating systems discussed above.

TABLE 3

Assembly and Sealability Performance

| TYPE | DIAM. [in] | WEIGHT [Lb/feet] | GRADE | CONNECTION | ASSEMBLY | | | SEALABILITY | | |
|------|------------|------------------|-------|------------|----------|--------|--------|-------------|-------|--------|
| | | | | | Side A | Side B | Result | Pressure (Psi) | Hold (min) | Result |
| Casing | 9⅝ | 36 | K-55 | ST & C | FMU | 5 MBG + FMU | No Galling | 3000 | 60 | No Leak |
| Casing | 5½ | 15.5 | K-55 | LC | FMU | 5 MBG + FMU | No Galling | 4800 | 60 | No Leak |

TABLE 3-continued

Assembly and Sealability Performance

| TYPE | DIAM. [in] | WEIGHT [Lb/feet] | GRADE | CONNECTION | ASSEMBLY | | | SEALABILITY | | |
|---|---|---|---|---|---|---|---|---|---|---|
| | | | | | Side A | Side B | Result | Pressure (Psi) | Hold (min) | Result |
| Tubing | 2⅞ | 6.5 | J-55 | EUE | FMU | 10 MBG + FMU | No Galling | 7200 | 60 | No Leak |
| Tubing | 2⅜ | 4.7 | J-55 | EUE | FMU | 10 MBG + FMU | No Galling | 7800 | 60 | No Leak |

The assembly tests were performed in accordance with ISO 13679 and API 5C1, the entirety of each of which are hereby incorporated by reference. During the assembly test, side B of casing and tubing received 5 MBG and 10 MBG, respectively, and side A received FMU. In the table, the designation "MBG" refers to make/break galling tests in which the assembly properties of the connection are tested through repeated assembly and disassembly operations. Testing of this type simulates field use. The designation "FMU" in the table above refers to final make up. Testing of this type simulates assembly operations normally performed at the mill. Substantially no galling was observed in either the make/break galling tests or the final make up tests.

The sealability tests were performed in accordance with API 5C1. During the sealability tests, the assembled joints were tested by pressurizing the joint internally with water. Once the internal pressure reached the values in the table for each size, the pressure was maintained for approximately one hour (e.g., about 60 minutes) and leakage from the connection was monitored. No leaks were found present in any of the joints tested.

An embodiment of the second coating system 114 comprising a one-component epoxy as the second epoxy layer 118 was further subjected to corrosion testing in order to establish the corrosion resistance of the coating. Corrosion testing was performed in accordance with ASTM B117, "Standard Practice for Operating Salt Spray (Fog) Apparatus," the entirety of which is hereby incorporated by reference. Embodiments of the tested samples of the second coating 114 were subjected to drying and curing over about 10 minutes at a temperature between about 60° C. to about 80° C. and further possessed a thickness of the one-component epoxy layer of between about 30 to about 40 microns. Corrosion testing was performed for about 300 hours of exposure to a saline fog after drying. After the exposure of about 300 hours, the second coating system 114 was found to exhibit good corrosion resistance.

Figure 4:
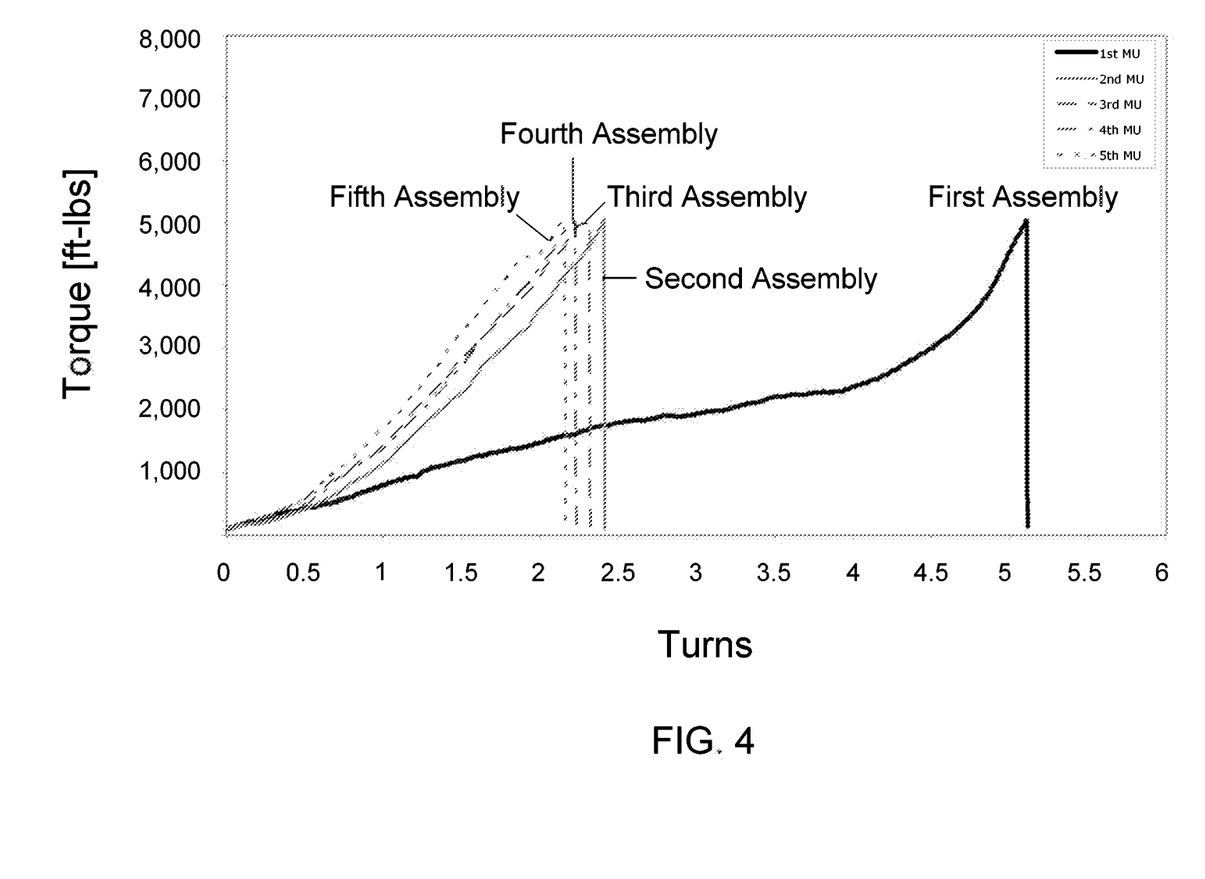
FIG. 4 is a plot illustrating torque as a function of turns during make-up/break out.

With reference to FIG. 4 a plot of torque as a function of turns is illustrated for testing of several assemblies and disassemblies (make-ups and break-outs) of a threaded connection employing an embodiment of the coating system 300 on the pin and box. These tests were performed to assess the lubricant properties of the coating and to assure that substantially no galling or wear of the material of the threaded connection occurs during assembly and disconnection.

The resulting curves were similar to the ones obtained with the use of dope (e.g., API dope). Furthermore, after the make and break cycles, there was substantially no galling or wear damage observed. These results illustrate that embodiments of the disclosed joints may provide assembly-disassembly behavior comparable to joints that employ dope but without the harmful environmental effects and other problems associated with underdoping and overdoping.

In summary, embodiments of the present disclosure present joints with improved performance (e.g., corrosion resistance, lubrication, sealability, mechanical performance) and methods of manufacturing the same. A combination of position assembly, production tolerances, and thread coatings on the pin and box are employed to provide these improvements. In particular, these joints may be applicable to threaded connections employed in oil and gas exploration. The disclosed embodiments may be further employed with pin and box members which do not include torque shoulders or metal-to-metal seals, providing improved joint performance without the added expense of these features.

As discussed above, these performance benefits may be achieved through a combination of position assembly, production tolerances, and thread coatings. Each of these aspects is needed for achievement of these improvements and, if one or more is absent from the joint, these performance improvements cannot be achieved. For example, if the coatings is absent from the joints, proper lubrication may be absent from the joint, increasing the likelihood of galling. Furthermore, if the coating is replaced by thread compounds (e.g., dope), environmental issues may arise. If tight production tolerances within the ranges specified herein are not employed, the final contact pressure experienced by the threads may vary significantly, leading to leak problems, even if the desired position assembly is achieved. If the position assembly is not within the defined range, the joint may be loose, leading to problems with mechanical integrity and leaking.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:
1. A method of assembling a joint, comprising:
depositing a first coating on a first pipe comprising a male threaded coupling at an end of the first pipe, wherein the first coating comprises:
a first adhesion promotion layer positioned on at least a portion of the threads of the first pipe;
a second semi-elastic layer positioned over at least a portion of the first layer, the second layer comprising anti-corrosion pigments; and
a third hydrophilic, deformable layer positioned over at least a portion of the second layer;
depositing a second coating on a second pipe comprising a female threaded coupling at an end of the second pipe, the female threaded coupling configured to receive the male threaded coupling of the first pipe, wherein the second coating comprises;
- a first adhesion promotion layer positioned over at least a portion of the threads of the second pipe;
- a second semi-elastic layer different from the second semi-elastic layer of the first coating positioned over at least a portion of the first layer, the second layer comprising particles of solid lubricant;
- a third hydrophilic, deformable layer positioned over at least a portion of the second layer.

2. The method of claim 1, wherein neither of the first and second pipes comprise a torque shoulder.

3. The method of claim 1, wherein the first pipe and the second pipe are assembled to form a joint and the assembled joint does not comprise a dope or grease.

4. The method of claim 1, wherein the wherein a thickness of each of the first layers of the first and second pipe is within the range between about 4 µm to about 10 µm.

5. The method of claim 1, wherein a thickness of each of the second layers of the first and second pipes is within the range between about 25 µm to about 50 µm.

6. The method of claim 1, wherein a thickness of the third layers of each of the first and second pipes is within the range between about 12 µm to about 15 µm.

7. The method of claim 1, wherein the first layers of the first and second pipes are manganese phosphate or zinc phosphate, the second layers of the first and second pipes each comprise an epoxy, and the third layers of the first and second pipes each comprise a wax.

8. The method of claim 1, wherein a pitch diameter of the threads of each of the first and second pipes is within approximately +/−0.0078".

9. The method of claim 8, wherein the pitch diameter of the threads of each of the first and second pipes is within approximately +/−0.004".

10. The method of claim 1, wherein a thread taper of the threads of each of the first and second pipes is approximately 0.060/0.0677.

11. The method of claim 10, wherein the thread taper of the threads of each of the first and second pipes is approximately 0.060/0.065.

12. The method of claim 1, wherein a thread ovality of the threads of each of the first and second pipes is less than or equal 0.010".

13. A method of assembling a joint, comprising:
depositing a first coating on at least a portion of male threads of a first pipe, the first coating comprising:
- a first layer comprising manganese phosphate or zinc phosphate, wherein a thickness of the first layer is between about 4 µm to about 10 µm;
- a second layer positioned over at least a portion of the first layer, the second layer comprising an epoxy and anti-corrosion pigments, wherein a thickness of the second layer is between about 25 µm to about 50 µm; and
- a third layer positioned over at least a portion of the second layer, the third layer comprising a wax, wherein a thickness of the third layer is between about 12 µm to about 15 µm;

depositing a second coating on at least a portion of female threads of a second pipe, the second coating comprising:
- a first layer comprising manganese phosphate or zinc phosphate, wherein a thickness of the first layer is between about 4 µm to about 10 µm;
- a second layer different from the second layer of the first coating positioned over at least a portion of the first layer, the second layer comprising an epoxy with particles of solid lubricant, wherein a thickness of the second layer is between about 25 µm to about 50 µm; and
- a third layer positioned over at least a portion of the second layer, the third layer comprising a wax, wherein a thickness of the third layer is between about 12 µm to about 15 µm;

wherein substantially no leakage is obtained when tested according to API 5C1 under internal pressure of about 7800 psi and time duration of about 60 minutes.

14. The method of claim 13, wherein a pitch diameter of the threads of each of the first and second pipe is within approximately +/−0.0078".

15. The method of claim 14, wherein the pitch diameter of the threads of each of the first and second pipe is within approximately +/−0.004".

16. The method of claim 13, wherein a thread taper of the threads of each of the first and second pipe is approximately 0.060/0.0677.

17. The method of claim 16, wherein the thread taper of the threads of each of the first and second pipe is approximately 0.060/0.065.

18. The method of claim 13, wherein a thread ovality of the threads of each of the first and second pipe is less than or equal 0.010".

19. The method of claim 13, wherein a pigment volume concentration of the second layers of the first and second coating is about 5% to about 50%.

20. The method of claim 19, wherein the pigment volume concentration is about 15% to about 40%.

21. The method of claim 13, wherein the second layer of the first coating has a higher hardness than the second layer of the second coating.

22. A joint, comprising:
- a first pipe comprising a male threaded coupling at an end of the first pipe;
- a second pipe comprising a female threaded coupling at an end of the second pipe, the female threaded coupling configured to receive the male threaded coupling of the first pipe;
- a first coating on the first pipe, the first coating comprising:
  - a first layer positioned over at least a portion of the threads of the first pipe, the first layer comprising a phosphate;
  - a second layer positioned over at least a portion of the first layer, the second layer comprising an epoxy and one or more corrosion inhibiting pigments;
  - a third layer positioned over at least a portion of the second layer, the third layer comprising a wax; and
- a second coating on the second pipe, the second coating comprising:
  - a first layer positioned over at least a portion of the threads of the second pipe, the first layer comprising a phosphate;
  - a second layer different from the second layer of the first coating positioned over at least a portion of the first layer, the second layer comprising an epoxy and one or more particles of solid lubricant;
  - a third layer positioned over at least a portion of the second layer, the third layer comprising a wax;
wherein neither of the first and second pipes comprise a torque shoulder.

23. The joint of claim 22, wherein the joint does not comprise a dope or grease.

24. The joint of claim 22, wherein the phosphate comprises one of manganese phosphate or zinc phosphate.

25. The joint of claim 24, wherein a thickness of the first phosphate layers of each of the first and second pipe is within the range between about 4 μm to about 10 μm.

26. The joint of claim 22, wherein a thickness of the second epoxy layers of each of the first and second pipes is within the range between about 25 μm to about 50 μm.

27. The joint of claim 22, wherein a concentration of the pigment is about 5% to about 50% of the total volume of the second layers of the first and second pipes.

28. The joint of claim 22, wherein the wax comprises an oxidized, microcrystalline wax.

29. The joint of claim 28, wherein a thickness of the third wax layer of the first and second pipes is within the range between about 12 μm to about 15 μm.

30. The joint of claim 22, wherein a pitch diameter of the threads of each of the first and second pipe are within approximately +/−0.0078".

31. The joint of claim 30, wherein the pitch diameter of the threads of each of the first and second pipe are within approximately +/−0.004".

32. The joint of claim 22, wherein a thread taper of the threads of each of the first and second pipe is approximately 0.060/0.0677.

33. The joint of claim 32, wherein the thread taper of the threads of each of the first and second pipe is approximately 0.060/0.065.

34. The joint of claim 22, wherein a thread ovality of the threads of each of the first and second pipe is less than or equal 0.010".

35. The joint of claim 22, wherein substantially no leakage is obtained when tested according to API 5C1 under internal pressure of about 7800 psi and time duration of about 60 minutes.

36. The joint of claim 22, wherein substantially no galling occurs after at least five assembly and disassembly operations of the joint.

37. The joint of claim 22, wherein the second layer of the second pipe comprises a single-component epoxy and exhibits substantially no corrosion under exposure to saline fog for at least 300 hours when tested according to ASTM B117.

38. A joint, comprising:
a first pipe comprising a male threaded coupling at an end of the first pipe;
a second pipe comprising a female threaded coupling at an end of the second pipe, the female threaded coupling configured to receive the male threaded coupling of the first pipe;
a first coating on the first pipe, the first coating comprising:
  a first layer positioned over at least a portion of the threads of the first pipe, the first layer comprising a phosphate;
  a second layer positioned over at least a portion of the first layer,
the second layer comprising an epoxy and one or more corrosion inhibiting pigments, the epoxy comprising a composition of:
  a first part comprising:
    about 20% epoxy resin;
    about 2% xylene;
    about 25% barium sulfate;
    about 5% zinc oxide;
    about 0.39% bentone;
    about 0.65% dioctyl phthalate;
    about 9% abestine; and
    about 0.6% aerosol; and
  a second component comprising:
    about 6% polyamide;
    about 5% xylene;
    about 20% bitumen;
    about 8% barium sulfate;
    about 0.56% aerosol;
    about 0.56% bentone; and
    about 0.5 catalyst;
  wherein the amounts of each component of the composition are on the basis of the weight of the composition and wherein the ratio of the first and second parts of the composition is about 1:1+/−5% by volume;
a third layer positioned over at least a portion of the second layer, the third layer comprising a wax; and
a second coating on the second pipe, the second coating comprising:
  a first layer positioned over at least a portion of the threads of the second pipe, the first layer comprising a phosphate;
  a second layer different from the second layer of the first coating positioned over at least a portion of the first layer, the second layer comprising an epoxy and one or more particles of solid lubricant;
  a third layer positioned over at least a portion of the second layer, the third layer comprising a wax;
wherein neither of the first and second pipes comprise a torque shoulder.

* * * * *